United States Patent [19]  
Richter

[11] 3,880,926  
[45] Apr. 29, 1975

[54] NEW COMPOSITIONS OF MATTER
[75] Inventor: Sidney B. Richter, Chicago, Ill.
[73] Assignee: Velsicol Chemical Corporation, Chicago, Ill.
[22] Filed: July 17, 1968
[21] Appl. No.: 745,405

[52] U.S. Cl. .......................... 260/566 AC; 424/327
[51] Int. Cl. ..................................... C07c 131/00
[58] Field of Search ................... 260/566 AC, 453

[56] References Cited
UNITED STATES PATENTS
3,063,823  11/1963  Köhle et al. .......................... 71/2.6
3,299,137  1/1967  Payne et al. ........................ 260/566

Primary Examiner—Leon Zitver
Assistant Examiner—Gerald A. Schwartz
Attorney, Agent, or Firm—Robert J. Schwarz; Dietmar H. Olesch

[57] ABSTRACT
This invention discloses new chemical compounds of the formula

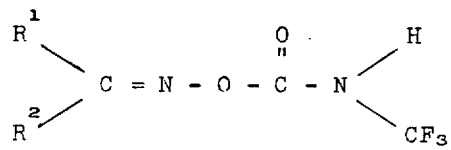

wherein R$^1$ is selected from the group consisting of alkyl, haloalkyl, alkoxyalkyl, alkylthioalkyl, dialkylaminoalkyl and

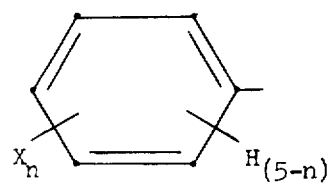

wherein X is selected from the group consisting of alkyl, alkenyl, halogen, haloalkyl, alkoxy, alkylthio, alkylsulfonyl, nitro and dialkylamino, and n is an integer from 0 to 5; and R$^2$ is selected from the group consisting of hydrogen and R$^1$. This invention further discloses new pesticidal compositions which comprise an inert carrier and a pesticidal amount of a compound described above, and a method for their use.

4 Claims, No Drawings

NEW COMPOSITIONS OF MATTER

This invention relates to new chemical compositions of matter, and more particularly to new compounds of the formula:

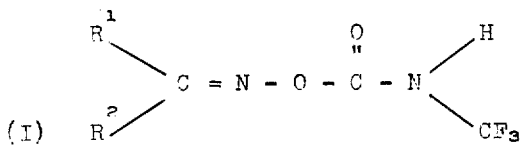

(I)

wherein $R^1$ is selected from the group consisting of alkyl, haloalkyl, alkoxyalkyl, alkylthioalkyl, dialkylaminoalkyl and

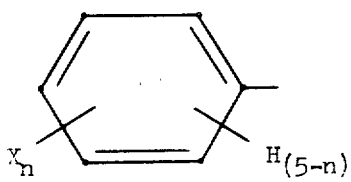

wherein X is selected from the group consisting of alkyl, alkenyl, halogen, haloalkyl, alkoxy, alkylthio, alkylsulfonyl, nitro and dialkylamino, and n is an integer from 0 to 5; and $R^2$ is selected from the group consisting of hydrogen and $R^1$.

In a preferred embodiment of this invention the substituent $R^1$ is selected from the group consisting of alkyl, chloroalkyl, bromoalkyl, alkoxyalkyl, alkylthioalkyl and dialkylaminoalkyl wherein each substituent contains a maximum of ten carbon atoms, and

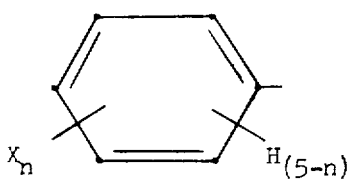

wherein X is selected from the group consisting of chlorine, bromine, nitro and alkyl, alkenyl, haloalkyl, alkoxy, alkylthio, alkylsulfonyl and dialkylamino having a maximum of six carbon atoms; the substituent $R^2$ is selected from the group consisting of hydrogen and the preferred $R^1$; and n is an integer from 0 to 3.

The compounds of the present invention are useful as pesticides, particularly as insecticides.

The compounds of this invention can be prepared readily from an oxime of the formula

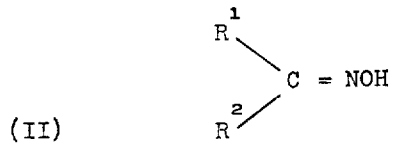

(II)

wherein $R^1$ and $R^2$ are as hereinabove described, by reacting the oxime with trifluoromethyl isocyanate. This reaction can be effected by adding the isocyanate to a solution of the oxime in a suitable inert organic solvent, such as benzene or toluene, in the presence of a tertiary amine catalyst, at a temperature of about −40°C to about the reflux temperature of the reaction mixture.

One convenient manner in which this reaction can be carried out comprises charging a solution of the oxime, along with a small amount of the tertiary amine catalyst, into a pressure vessel, cooling the solution to about −40°C and adding trifluoromethyl isocyanate in a stoichiometric proportion to the oxime. The pressure vessel is then sealed and can be allowed to warm up to room temperature, or can be heated at elevated temperatures to accelerate the reaction. After the reaction is completed the desired product can be recovered by evaporating the solvent from the reaction mixture to leave the product as a residue. In some instances the desired product forms as a precipitate and can be recovered by filtration, or the product can be precipitated upon the addition of a diluent. The product can then be used as such or can be further purified by washing, recrystallizing or other common methods in the art.

The oxime compounds of formula II, when not readily available, can be prepared from the corresponding aldehyde or ketone of the formula

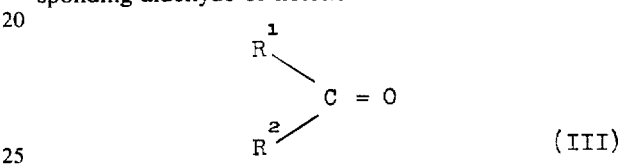

(III)

wherein the substituents $R^1$ and $R^2$ are as hereinabove described, by reaction with hydroxylamine hydrochloride. This reaction is readily effected by dissolving the reactants in in inert, anhydrous, organic solvent, such as absolute alcohol, and adding the tertiary amine thereto. The reaction mixture can then be heated at the reflux temperature to accelerate the reaction. The desired product can then be recovered by filtration, if formed as a precipitate, or by evaporation of the solvent. The resultant product can then be used as such or can be further purified by washing, extraction or other methods common to the art.

Exemplary of the aldehydes and ketones which are suitable starting materials for preparing the compounds of the present invention are: propanal, butanal, hexanal, decanal, propanone, 2-pentanone, 3-pentanone, 2-hexanone, 3-hexanone, 3-methoxy-2-propanone, 1-methoxy-2-butanone, 1-ethoxy-2-butanone, 2-bromo-3-methylbutanal, 3-butoxybutanal, 3-dimethylaminobutanal, 3-ethylthiobutanal, 2-butenal, 4-methyl-3-penten-2-one, benzaldehyde, 2,6-dimethylbenzaldehyde, 3-methoxybenzaldehyde, 4-methylsulfonylbenzaldehyde, 1-phenyl-2-propanone, benzophenone, 2-dimethylaminobenzophenone, and the like.

The manner in which the compounds of the present invention can be prepared readily is further illustrated in the following examples.

EXAMPLE 1

Preparation of O-(N-Trifluoromethylcarbamoyl)-ethanal Oxime

A solution of ethanal oxime (5.9 grams; 0.1 mol) in toluene (50 ml) is placed into a pressure vessel and is cooled to about −40°C. Trifluoromethyl isocyanate (11.1 grams; 0.1 mol) is added to the solution and the reaction vessel is sealed. The reaction mixture is then warmed up to about 50°C and is allowed to stand for a period of about 4 hours. After this time the reaction vessel is opened and the solvent is stripped from the reaction mixture under reduced pressure leaving O-(N-trifluoromethylcarbamoyl)-2-ethanal oxime as the product.

EXAMPLE 2

Preparation of O-(N-Trifluoromethylcarbamoyl)-2-propanone Oxime

A solution of 2-propanone oxime (7.3 grams) in toluene (30 ml) and pyridine (0.5 ml) are placed into a pressure vessel. The solution is cooled to about −40°C and trifluoromethyl isocyanate (11.1 grams; 0.1 mol) is added thereto. The pressure vessel is sealed and heated to a temperature of about 50°C for a period of about 6 hours. After this time the contents are removed from the pressure vessel and are stripped of toluene under reduced pressure leaving O-(N-trifluoromethylcarbamoyl)-2-propanone oxime as the product.

EXAMPLE 3

Preparation of O-(N-Trifluoromethylcarbamoyl)-3-ethoxy-2-butanone Oxime

A solution of 3-ethoxy-2-butanone oxime (13.1 grams; 0.1 mol) in toluene (50 ml) is placed into a suitable pressure vessel, and is cooled in an acetone-dry ice bath. Pyridine (0.5 ml) and trifluoromethyl isocyanate (11.1 grams; 0.1 mol) are added thereto and the pressure vessel is sealed. The reaction mixture is then heated to about 60°C for a period of about 6 hours. After this time the reaction mixture is stripped of solvent under reduced pressure to yield the desired product O-(N-trifluoromethylcarbamoyl)-3-ethoxy-2-butanone oxime.

EXAMPLE 4

Preparation of O-(N-Trifluoromethylcarbamoyl)-3-ethylthiobutanal Oxime

A solution of 3-ethylthiobutanal oxime (14.7 grams; 0.1 mol) in toluene (50 ml), and pyridine (0.5 ml) are charged into a pressure vessel and are cooled in an acetone-dry ice bath. Trifluoromethyl isocyanate (11.1 grams; 0.1 mol) is then added thereto and the pressure vessel is sealed. The reaction mixture is then heated at a temperature of about 60°C for a period of about 5 hours. After this time the reaction mixture is stripped of solvent to yield the desired product O-(N-trifluoromethylcarbamoyl)-3-ethylthiobutanal oxime.

EXAMPLE 5

Preparation of 3-Dimethylaminobutanal Oxime

3-Dimethylaminobutanal (11.4 grams; 0.1 mol), hydroxylamine hydrochloride (7 grams; 0.1 mol) and absolute ethanol (250 ml) are charged into a 500 ml glass reaction flask equipped with stirrer, thermometer and a reflux condenser that is topped with a drying tube. The reaction mixture is stirred and pyridine (12 grams; 0.15 mol) is slowly added thereto. The reaction mixture is then heated at reflux for a period of about four hours. After this time the reaction mixture is cooled and stripped of solvent under reduced pressure to yield a solid. The solid product is then washed with water and dried in a vacuum desiccator to yield the desired product 3-dimethylaminobutanal oxime.

EXAMPLE 6

Preparation of O-(N-Trifluoromethylcarbamoyl)-3-dimethylaminobutanal Oxime

A solution of 3-dimethylaminobutanal oxime (12.9 grams; 0.1 mol) in toluene (50 ml) and pyridine (0.5 ml) are placed in a 100 ml glass reaction flask equipped with stirrer thermometer and reflux condenser. Trifluoromethylisocyanate (15 grams; 0.13 mol) is bubbled into the reaction mixture with vigorous stirring at a temperature of about 50°C. After the addition is completed the reaction mixture is stirred for an additional period of about 1 hour at the reflux temperature of the reaction mixture. After this time the reaction mixture is stripped of solvent under reduced pressure to yield the desired product O-(N-trifluoromethylcarbamoyl)-3-dimethylaminobutanal oxime.

EXAMPLE 7

Preparation of O-(N-Trifluoromethylcarbamoyl)-benzaldehyde Oxime

A solution of benzaldehyde oxime (12.1 grams; 0.1 mol) in toluene (100 ml) and pyridine (0.5 ml) are charged into a 200 ml glass reaction flask equipped with stirrer, reflux condenser and gas inlet tube. Trifluoromethyl isocyanate (15 grams; 0.13 mol) is slowly bubbled into the solution with vigorous stirring at a temperature of about 60°C. After the addition is completed the reaction mixture is stirred for an additional period of about 2 hours. After this time the reaction mixture is stripped of solvent to yield the desired product O-(N-trifluoromethylcarbamoyl)-benzaldehyde oxime.

EXAMPLE 8

Preparation of O-(N-Trifluoromethylcarbamoyl)-2,6-dimethylbenzaldehyde Oxime

A solution of 2,6-dimethylbenzaldehyde oxime (14.8 grams; 0.1 mol) in toluene (100 ml), and pyridine (0.5 ml) are charged into a 200 ml glass reaction flask equipped with stirrer, reflux condenser and gas inlet tube. Trifluoromethyl isocyanate (15 grams; 0.13 mol) is slowly bubbled into the solution with vigorous stirring at a temperature of about 70°C. After the addition is completed the reaction mixture is stirred for an additional period of about 2 hours. After this time the reaction mixture is stripped of solvent to yield desired product O-(N-trifluoromethylcarbamoyl)-2,6-dimethylbenzaldehyde oxime.

EXAMPLE 9

Preparation of 2-Dimethylamino-5-chloro-4'-methylbenzophenone Oxime

2-Dimethylamino-5-chloro-4'-methylbenzophenone (27.3 grams; 0.1 mol), hydroxylamine hydrochloride (7 grams; 0.1 mol) and absolute ethanol (250 ml) are charged into a 500 ml glass reaction flask equipped with stirrer, thermometer and a reflux condenser that is topped with a drying tube. The reaction mixture is stirred and pyridine (12 grams; 0.15 mol) is slowly added. The reaction mixture is then heated at reflux for a period of about 3 hours. After this time the reaction mixture is cooled and stripped of solvent under reduced pressure to yield a solid. The solid product is washed with water and is dried in a vacuum desiccator to yield the desired product 2-dimethylamino-5-chloro-4'-methylbenzophenone oxime.

EXAMPLE 10

Preparation of O-(N-Trifluoromethylcarbamoyl)-2-dimethylamino-5-chloro-4'-methylbenzophenone Oxime A solution of 2-dimethylamino-5-chloro-4'-methylbenzophenone (28.8 grams; 0.1 mol) in toluene (100 ml), and pyridine (0.5 ml) are placed into a glass reaction flask equipped with stirrer, reflux condenser and gas inlet tube. Trifluoromethyl isocyanate (15 grams; 0.13 mol) is slowly added to the solution with vigorous stirring at a temperature of about 70°C. After the addition is completed the reaction mixture is stirred for an additional period of about 2 hours. After this time the reaction mixture is stripped of solvent to yield the desired product O-(N-trifluoromethylcarbamoyl)-2-dimethylamino-5-chloro-4'-methylbenzophenone oxime.

Other compounds within the scope of this invention can be prepared by the procedures described in the foregoing examples. Presented in the following examples are the essential ingredients required to prepare the indicated named compounds according to the procedures heretofore described.

EXAMPLE 11

3-Chlorobenzaldehyde oxime + trifluoromethyl isocyanate = O-(N-trifluoromethylcarbamoyl)-3-chlorobenzaldehyde oxime.

EXAMPLE 12

1-Phenyl-2-propanone + hydroxylamine hydrochloride + trifluoromethyl isocyanate = O-(N-trifluoromethylcarbamoyl)-1-phenyl-2-propanone oxime.

EXAMPLE 13

3-Fluorobenzaldehyde oxime + trifluoromethyl isocyanate = O-(N-trifluoromethylcarbamoyl)-3-fluorobenzaldehyde oxime.

EXAMPLE 14

3-Methoxybenzaldehyde oxime + trifluoromethyl isocyanate = O-(N-trifluoromethylcarbamoyl)-3-methoxybenzaldehyde oxime.

EXAMPLE 15

Benzophenone oxime + trifluoromethyl isocyanate = O-(N-trifluoromethylcarbamoyl)-benzophenone oxime.

EXAMPLE 16

4-Nitrobenzophenone oxime + trifluoromethyl isocyanate = O-(N-trifluoromethylcarbamoyl)-4-nitrobenzophenone oxime.

EXAMPLE 17

3,4-Dichlorobenzophenone oxime + trifluoromethyl isocyanate = O-(N-trifluoromethylcarbamoyl)-3,4-dichlorobenzophenone oxime.

Additional compounds within the scope of the present invention which can be prepared in a manner similar to that detailed in the foregoing examples, but which are not intended to limit this invention are:

O-(N-trifluoromethylcarbamoyl)-propanal oxime
O-(N-trifluoromethylcarbamoyl)-n-butanal oxime
O-(N-trifluoromethylcarbamoyl)-n-hexanal oxime
O-(N-trifluoromethylcarbamoyl)-n-decanal oxime
O-(N-trifluoromethylcarbamoyl)-2-n-pentanone oxime
O-(N-trifluoromethylcarbamoyl)-2-n-hexanone oxime
O-(N-trifluoromethylcarbamoyl)-3-n-pentanone oxime
O-(N-trifluoromethylcarbamoyl)-3-n-hexanone oxime
O-(N-trifluoromethylcarbamoyl)-3-methoxy-2-propanone oxime
O-(N-trifluoromethylcarbamoyl)-1-methoxy-2-butanone oxime
O-(N-trifluoromethylcarbamoyl)-3-propoxy-2-butanone oxime
O-(N-trifluoromethylcarbamoyl)-1-ethoxy-2-hexanone oxime
O-(N-trifluoromethylcarbamoyl)-2-bromo-3-methylbutanal oxime
O-(N-trifluoromethylcarbamoyl)-3-butoxybutanal oxime
O-(N-trifluoromethylcarbamoyl)-4-methyl-3-penten-2-one oxime
O-(N-trifluoromethylcarbamoyl)-2-butanal oxime
O-(N-trifluoromethylcarbamoyl)-2,6-dimethylbenzaldehyde oxime
O-(N-trifluoromethylcarbamoyl)-3-iodobenzaldehyde oxime
O-(N-trifluoromethylcarbamoyl)-3-pentyloxybenzaldehyde oxime
O-(N-trifluoromethylcarbamoyl)-3-methoxy-2-propoxybenzaldehyde oxime
O-(N-trifluoromethylcarbamoyl)-2,4,6-trimethylbenzaldehyde oxime
O-(N-trifluoromethylcarbamoyl)-4-methylsulfonylbenzaldehyde oxime
O-(N-trifluoromethylcarbamoyl)-2chloro-4-methylsulfonylbenzaldehyde oxime
O-(N-trifluoromethylcarbamoyl)-4-decyloxybenzaldehyde oxime
O-(N-trifluoromethylcarbamoyl)-4-dihexylaminobenzaldehyde oxime
O-(N-trifluoromethylcarbamoyl)-3-t-butylbenzaldehyde oxime
O-(N-trifluoromethylcarbamoyl)-3-n-pentylthiobenzaldehyde oxime
O-(N-trifluoromethylcarbamoyl)-4-decylthiobenzaldehyde oxime
O-(N-trifluoromethylcarbamoyl)-4-pentylsulfonylbenzaldehyde oxime
O-(N-trifluoromethylcarbamoyl)-3-(2-hexenyl)-benzaldehyde oxime
O-(N-trifluoromethylcarbamoyl)-1-(3'-bromophenyl)-2-propanone oxime
O-(N-trifluoromethylcarbamoyl)-4-phenyl-2-butanone oxime
O-(N-trifluoromethylcarbamoyl)-4-methylthiobenzophenone oxime
O-(N-trifluoromethylcarbamoyl)-2-dimethylaminobenzophenone oxime
O-(N-trifluoromethylcarbamoyl)-3-chlorobenzophenone oxime
O-(N-trifluoromethylcarbamoyl)-2-dimethylamino-5-chloro-4'-n-butylbenzophenone oxime
O-(N-trifluoromethylcarbamoyl)-4-trifluoromethylbenzophenone oxime
O-(N-trifluoromethylcarbamoyl)-2-dimethylamino-5-chloro-2,4'-dimethylbenzophenone oxime
O-(N-trifluoromethylcarbamoyl)-4-methoxy-2',4'-dichlorobenzophenone oxime For practical use as pesticides, the compounds of this invention are generally incorporated into pesticidal compositions which comprise an inert carrier and a pesticidally toxic amount of such a compound. Such pesticidal compositions, which can also be called formulations, enable the active compound to be applied conveniently to the site of the pest infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of pesticides can be dispersed under superatmospheric pressure as aerosols. However, preferred liquid pesticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the pest infestations. The emulsifiers most commonly used in these concentrates are nonionic or mixtures of nonionic with anionic surface-active agents.

A typical pesticidal composition according to this invention is illustrated by the following example, in which the quantities are in parts by weight.

EXAMPLE 18

Preparation of a Dust

| Product of Example 1 | 10 |
|---|---|
| Powdered talc | 90 |

The above ingredients are mixed in a mechanical grinder-blender and are ground until a homogeneous, free-flowing dust of the desired particle size is obtained. This dust is suitable for direct application to the site of the pest infestation.

When used as insecticides the compounds of this invention can be applied in any manner recognized by the art. One method for destroying insects comprises applying to the locus of the insect infestation, an insecticidal composition comprising an inert carrier and as the essential active ingredient, in a quantity which is toxic to said insects, a compound of the present invention. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal composition will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides in the insecticidal compositions heretofore described. These other insecticides can comprise from about 5% to about 95% of the active ingredients in the insecticidal compositions. Use of the combinations of these other insecticides with the compounds of the present invention provide insecticidal compositions which are more effective in controlling insects and often provide results unattainable with separate compositions of the individual insecticides. The other insecticides with which the compounds of this invention can be used in the insecticidal compositions to control insects, can include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbonphenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal and nematocidal chemical compounds to form pesticidal compositions useful for the control of fungi and in some cases soil nematodes as well as insects. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate and the like; while examples of nematodicidal compounds are chloropicrin, O,O-diethyl O-(2,4-dichlorophenyl) phosphorothioate, tetrachlorothiophene, dazomet, dibromochloropropane, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects such as the Mexican bean beetle, the southern army-worm; the piercing-sucking insects, such as the pea aphid, the cereal leaf beetle, the house fly, the grape leafhopper, the chinch bug, the lygus bugs, oyster shell scale, the California red scale, the Florida red scale, the soft scale and mosquitoes; the internal feeders, including borers such as the European corn borer, the peach twig borer and the corn earworm, worms or weevils such as the codling moth, alfalfa weevil, cotton boll weevil, pink boll worm, plum curculio, red banded leaf roller, melonworm, cabbage looper and apple maggot, leaf miners such as the apple leaf miner, birch leaf miner and beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites and ticks can be controlled by the compounds of this present invention such as the red spider mite, the two spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The insecticidal utility of the compounds of the present invention can be demonstrated in a variety of experiments well known in the art. For example, the effectiveness of the compounds of this invention for the control of the common housefly (*Musca domestica*) can be shown in an experiment wherein the test compounds are formulated as aqueous emulsions of acetone solution and are then sprayed on fifty adult flies which have been placed into screen cages. The mortality of the flies is then determined after a period of 48 hours and rated in comparison with untreated controls. The results of this experiment demonstrate the utility of the compounds of this invention as insecticides.

I claim

1. A compound of the formula

wherein $R^1$ is selected from the group consisting of alkyl, haloalkyl, alkoxyalkyl, alkylthioalkyl, and dialkylaminoalkyl wherein each substituent contains a maximum of ten carbon atoms and $R^2$ is selected from the group consisting of hydrogen and $R^1$.

2. The compound of claim 1, O-(N-trifluoromethylcarbamoyl)-ethanal oxime.

3. The compound of claim 1, O-(N-trifluoromethylcarbamoyl)-2-propanone oxime.

4. The compound of claim 1, O-(N-trifluoromethylcarbamoyl)-3-ethoxy-2-butanone oxime.

* * * * *